United States Patent [19]
Coffey et al.

[11] Patent Number: 5,186,354
[45] Date of Patent: Feb. 16, 1993

[54] TANK AND A SUPPORT HOUSING FOR SUPPORTING A BLADDER

[75] Inventors: Manus Coffey, Newtownmountkennedy, Ireland; Michael G. McGarry, Ottawa, Canada

[73] Assignee: Harouniya Limited, Dublin, Ireland

[21] Appl. No.: 681,000

[22] Filed: Apr. 5, 1991

[30] Foreign Application Priority Data

Apr. 5, 1990 [IE] Ireland .................................. 1224/90

[51] Int. Cl.⁵ ........................... B65D 6/12; B65D 6/40
[52] U.S. Cl. .................................... 220/720; 220/723; 220/905
[58] Field of Search .................... 220/85 A, 85 B, 905, 220/720, 723

[56] References Cited

U.S. PATENT DOCUMENTS 3,791,164  2/1974  Laverman ........................... 220/451
4,763,805  8/1988  Strock ................................ 220/85 A

FOREIGN PATENT DOCUMENTS 292839   11/1968  Australia ........................... 220/85 B
3305903   2/1983  Fed. Rep. of Germany .... 220/85 B
2247901   5/1975  France .............................. 220/85 B
941497   11/1963  United Kingdom .............. 220/85 B Primary Examiner—Joseph M. Moy
Attorney, Agent, or Firm—Jacobson, Price, Holman & Stern

[57] ABSTRACT

A sewage tank comprising an outer shell of plywood which includes a platform for supporting a toilet pan. An inner lining of a compressible plastic material lines the interior of the outer shell and defines a hollow interior region of variable volume for a bladder for storing sewage. The inner lining accommodates expansion and contraction of the bladder in the event of freezing and thawing of the contents thereof. The contents of the toilet pan are discharged into the bladder, and sewage is discharged from the bladder under pressure through a discharge pipe.

19 Claims, 7 Drawing Sheets

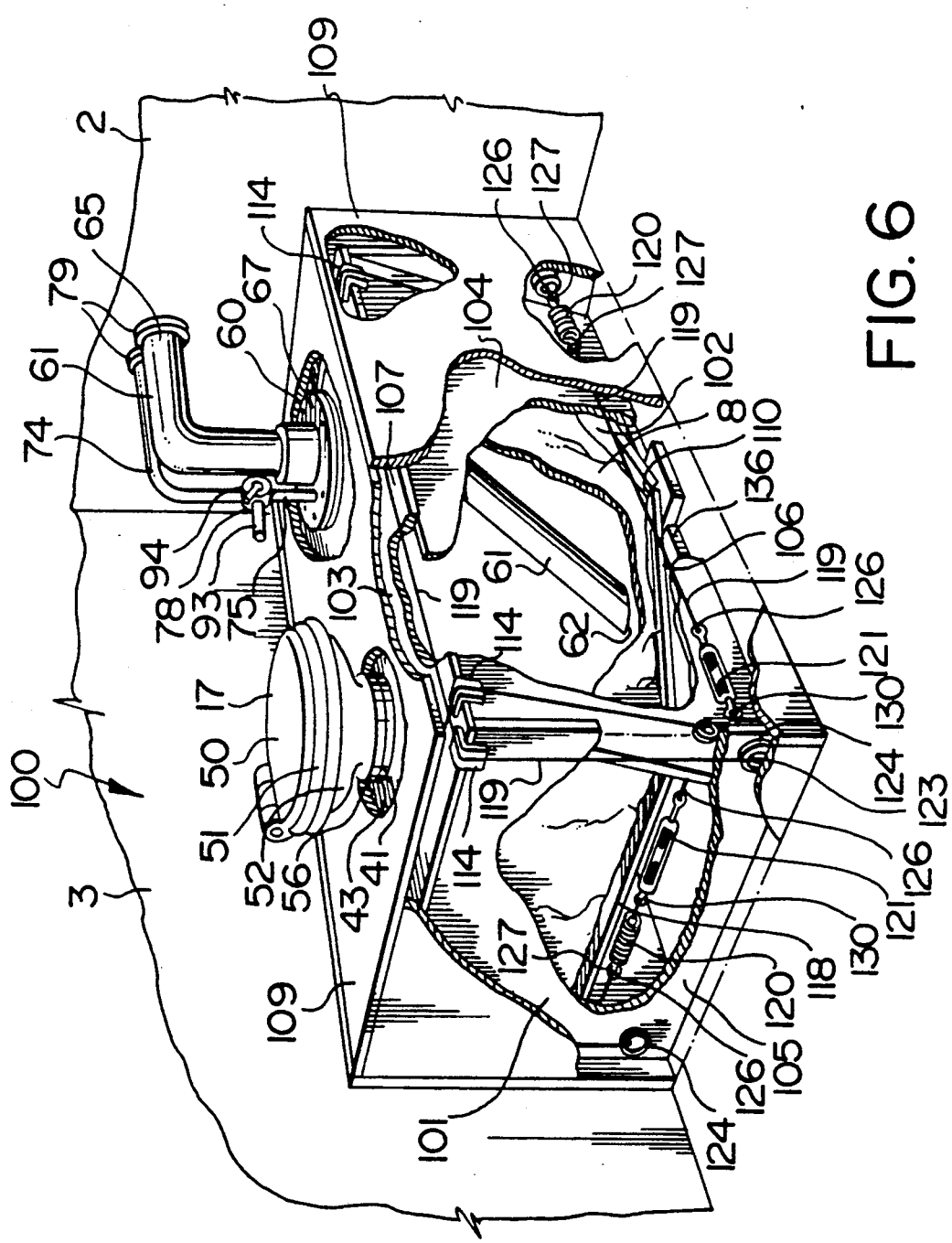

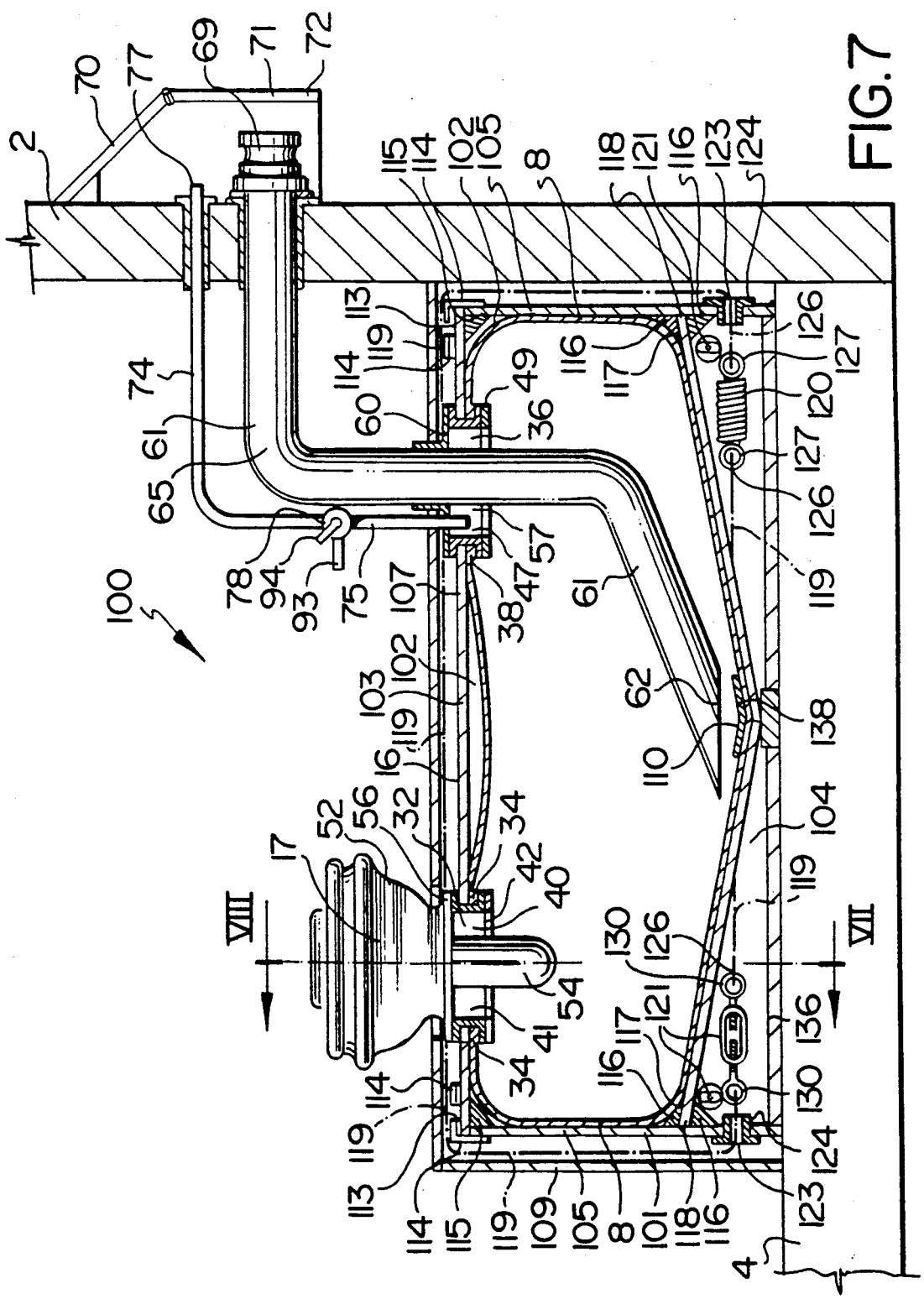

TANK AND A SUPPORT HOUSING FOR SUPPORTING A BLADDER

FIELD OF THE INVENTION

The present invention relates to a tank, and in particular though not limited to a sewage tank, and the invention also relates to a support housing for supporting a bladder.

BACKGROUND OF THE INVENTION

In arctic and antarctic regions, sewage disposal is a considerable problem. In general, it is not possible to pipe sewage from houses and other buildings to a central treatment plant due to the fact that the sewage would freeze in the pipes. Furthermore, in areas where the permafrost extends to a significant depth, it is not feasible to lay sewage pipes. Indeed, even where sewage pipes could be laid to a sufficient depth to avoid freezing of the sewage, in general, it is not practicable to provide a central sewage treatment plant, due to the fact that the liquid contents of the treatment plant would freeze. Various attempts have been made to overcome these problems without success. Typically, sewage tanks are provided in houses or buildings, or indeed, below the foundations of such buildings. Sewage is subsequently pumped from these tanks. However, a major problem with such tanks is that the sewage contents of the tanks freeze. This, in general, causes rupturing of the tank, which leaves the tank unusable.

There is therefore a need for a sewage tank which overcomes these problems.

OBJECTS OF THE INVENTION

One object of the invention is to provide a sewage tank which overcomes the problems of known sewage tanks. In particular, it is an object of the invention to provide a sewage tank which does not rupture in the event of freezing of the contents. Another object of the invention is to provide a sewage tank which, in certain circumstances, may be used in direct combination with a toilet pan. A further object of the invention is to provide a support housing for a bladder.

SUMMARY OF THE INVENTION

According to the invention, there is provided a support housing for supporting a bladder, the housing being of a relatively rigid material and defining a hollow interior region for the bladder, the interior region being of variable volume for accommodating expansion and contraction of the bladder, and the housing having an inlet to the hollow interior region.

In one embodiment of the invention, the housing comprises an outer shell defining an inner surface, and an inner lining of a deformable resilient material defining at least portion of the hollow interior region being provided on at least portion of the inner surface of the outer shell. Advantageously, the deformable resilient material is a compressible material. Preferably, the deformable resilient material is a plastic material.

Advantageously, the outer shell is of the relatively rigid material.

Alternatively, the housing comprises a plurality of walls, the walls defining the hollow interior region, and resilient connecting means retaining at least some of the walls in position for accommodating relative movement of the said at least some walls, for varying the volume of the interior region. Preferably, opposite walls of the housing are retained together by the resilient connecting means. Advantageously, each resilient connecting means comprises a spring means connected to respective walls by a cable. Preferably, adjustment means for adjusting the retaining force in each spring means is provided.

In another embodiment of the invention, heat insulating means is provided in the housing for insulating at least portion of the bladder.

In a further embodiment of the invention, the housing comprises a top wall which forms a platform for receiving a toilet pan, the housing inlet to the interior region being formed by an opening in the platform, and mounting means being provided on the platform for mounting the toilet pan thereon with an outlet from the toilet pan communicating with an inlet to the bladder through the housing inlet for discharging the contents of the toilet pan into the bladder.

In a further embodiment of the invention, the housing comprises a pair of side walls joined by a pair of end walls, the said side and end walls extending downwardly from the top wall, and a base extending between the side and end walls.

In a still further embodiment of the invention, the base comprises an upper surface which defines portion of the interior region of the housing, the said upper surface inclining inwardly downwardly from the opposite end walls.

Additionally, the invention provides a tank comprising a support housing according to the invention, and a bladder mounted in the hollow interior region, the bladder having an inlet, communicating with the housing inlet.

Preferably, the bladder comprises a bladder outlet and the support housing comprises a housing outlet from the interior region, the bladder outlet communicating with the housing outlet for discharge of the contents of the bladder. Advantageously, a discharge outlet pipe extends through the housing outlet and the bladder outlet for discharging the contents thereof. Preferably, the discharge outlet pipe extends downwardly into the bladder to a relatively low position in the bladder for discharging the contents thereof.

In one embodiment of the invention, the discharge outlet pipe inclines downwardly from its highest point to an inlet thereto or an outlet therefrom to avoid the collection of sewage therein.

In a further embodiment of the invention, a toilet pan comprising a bowl defining an interior region is mounted on the platform, a toilet outlet from the interior region of the bowl communicating with the bladder through the housing inlet and the bladder inlet, and plug means for releasably and sealably engaging the interior region of the toilet pan being provided for permitting pressurization of the bladder for discharge of the contents therefrom. Preferably, pressure release means for relieving pressure in the bladder are provided on the plug means.

ADVANTAGES OF THE INVENTION

The advantages of the invention are many. A particularly important advantage of the invention is that the sewage tank according to the invention is capable of withstanding freezing of the contents, and in particular, the tank according to the invention does not rupture in the event of the contents thereof freezing. Another advantage of the invention is that the sewage tank is particularly suitable for mounting internally in a house or beneath the foundations of a house. Another advantage of the invention is that the sewage tank is suitable for using in combination with a toilet pan. Another advantage of the invention is that the contents of the sewage tank can readily easily be pumped therefrom.

Another advantage of the invention is that it provides a support housing for a bladder which accommodates expansion and contraction of the bladder without any danger of rupture of the bladder or the support housing.

These and other advantages and objects of the invention will be readily apparent to those skilled in the art from the following description of some preferred embodiments thereof, which are given by way of example only, with reference to the accompanying drawings.

BRIEF DESCRIPTION OF THE DRAWINGS

FIG. 6 is a perspective view of a sewage tank according to another embodiment of the invention, FIG. 7 is a sectional side elevational view of the sewage tank of FIG. 6.

DETAILED DESCRIPTION OF THE DRAWINGS

Figure 1:
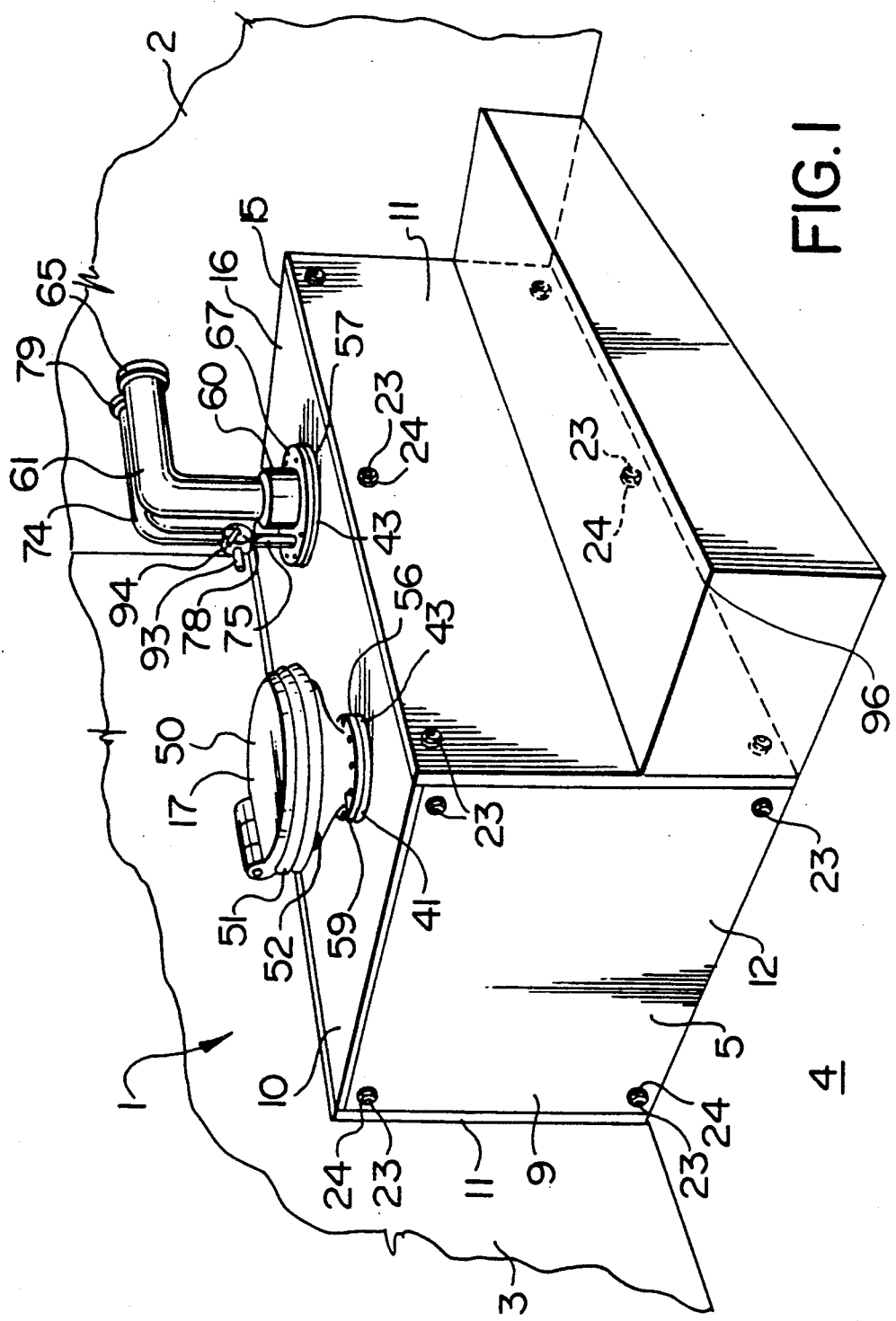
FIG. 1 is a perspective view of a sewage tank according to the invention.
Figure 2:
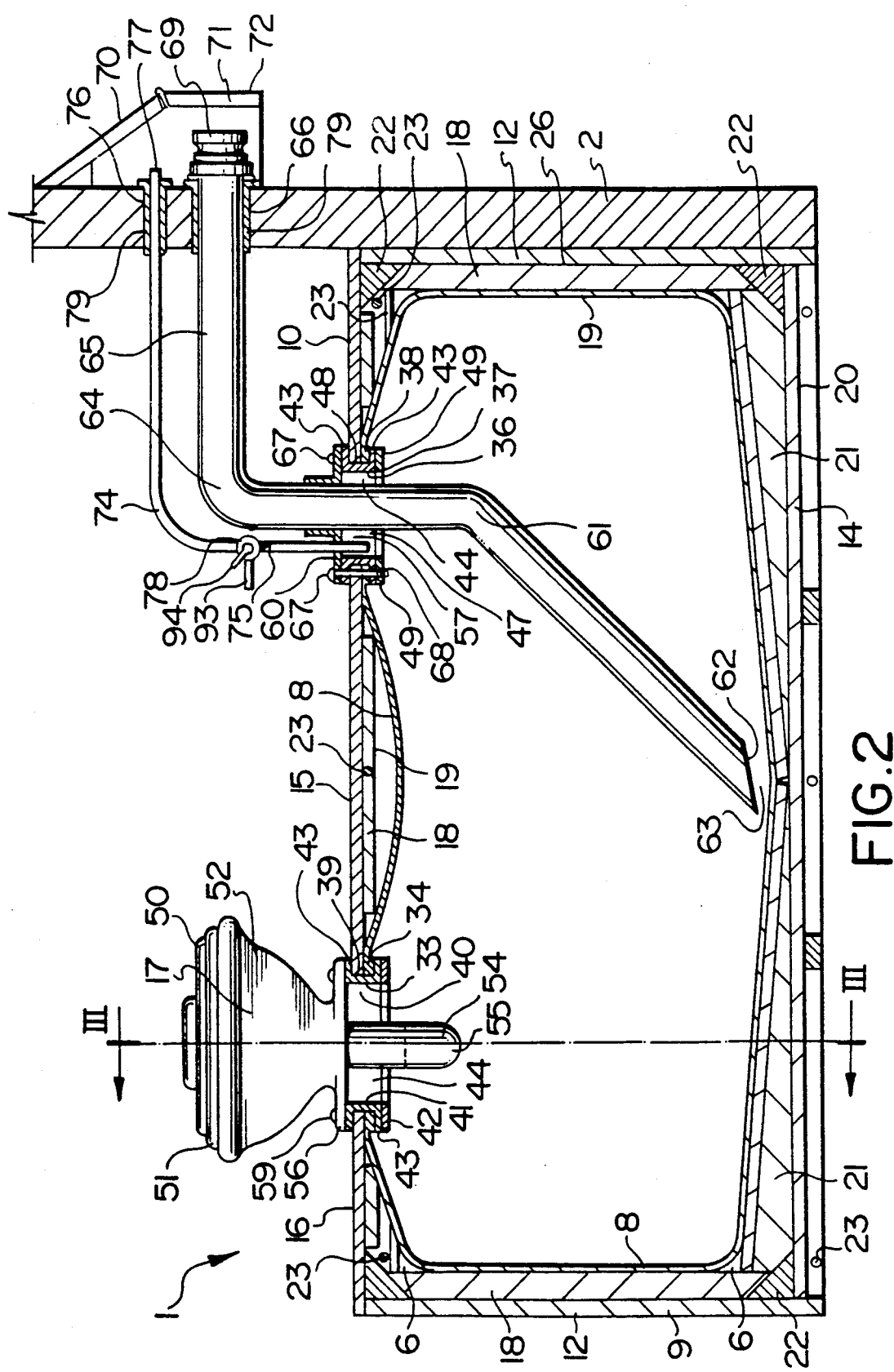
FIG. 2 is a sectional side elevational view of the sewage tank of FIG. 1.
Figure 3:
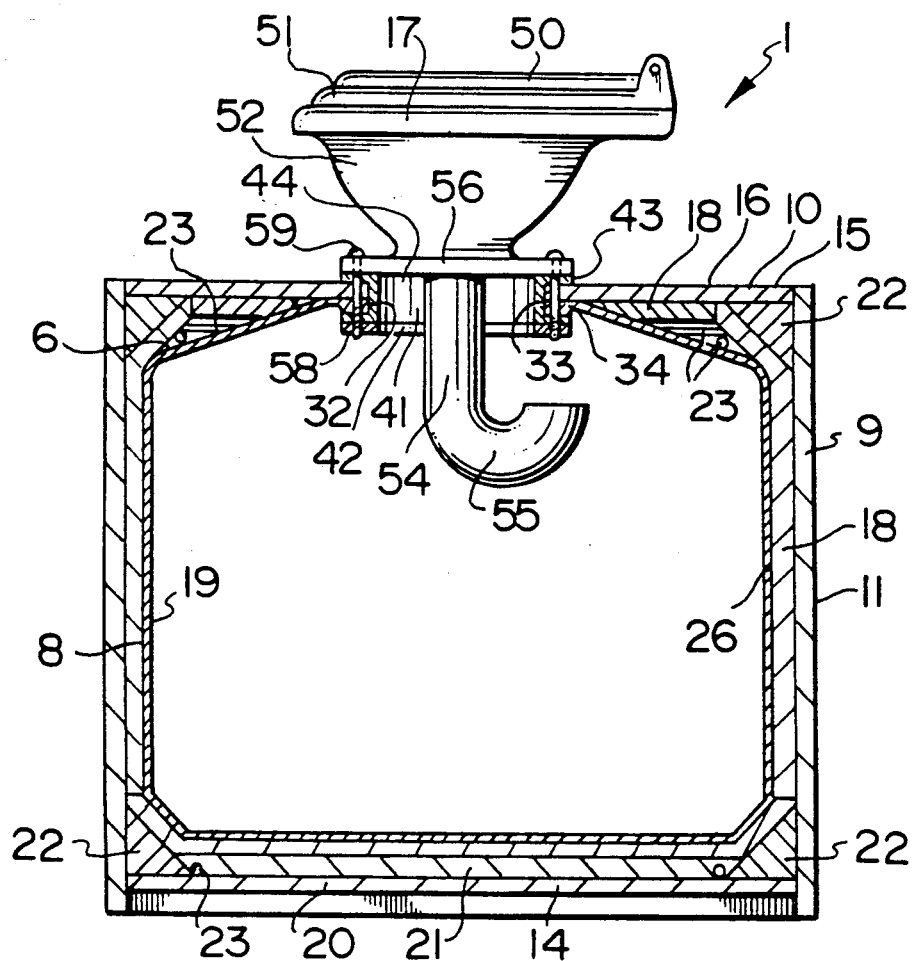
FIG. 3 is a sectional end elevational view on the line III—III of FIG. 2 of the sewage tank of FIG. 1.

Referring to the drawings, and initially to FIGS. 1 to 5, there is illustrated a tank in this case a sewage tank according to the invention indicated generally by the reference numeral 1. The sewage tank 1 is particularly suitable for use internally in a house, and in particular, for use in a house in an arctic or antarctic region, or in a cold climate. Although, needless to say, the sewage tank 1 may be used, if desired, in a temperate or warm climate. The sewage tank 1, if desired, may be provided externally of the house or beneath the foundations or the ground floor of the house. In FIG. 1, the sewage tank 1 is illustrated in a room, namely, a toilet having walls 2 and 3 and a floor 4. The tank 1 is mounted on the floor 4.

The sewage tank 1 comprises a support housing 5 also according to the invention which defines a hollow interior region 6 of variable volume for accommodating and supporting a bladder 8 for holding sewage. The bladder 8 is described in more detail below. The support housing 5 comprises an outer shell 9 which comprises a top wall 10 which forms a platform 15 having an upper surface 16 for receiving a toilet pan 17. A pair of opposite side walls 11 joined by a pair of opposite end walls 12 extend downwardly from the top wall 10 to a base 14. The top wall 10, side walls 11 and end walls 12 are of a relatively rigid material, in this case, provided by plywood panels. The base 14 is also of a relatively rigid material comprising a plywood panel 20 and a panel 21 of expanded polystyrene material bonded to the panel 20. The polystyrene panel 21 extends the width of the base 14 between the side walls 11 and the extends the length of the base between the end walls 12 and acts as a heat insulation panel for insulating the bottom of the bladder 8. Elongated corner fillets 22 of timber extend along the joints between the top wall 10, side walls and end walls 11 and 12 and the base 14 for receiving screws (not shown) for securing the walls and the base together. Threaded tie rods 23 extending between and through the opposite side walls 11 and the opposite end walls 14 secure the side and end walls 11 and 12 against pressure of sewage in the bladder 8. Nuts 24 on the threaded tie rods 23 engage the side and end walls 11 and 12.

The top wall 10, side and end walls 11 and 12, the panel 21 of the base 14 and the fillets 22 define an inner surface 26 of the outer shell 9 of the support housing 5. An inner lining 18 of a compressible deformable resilient material, namely, closed cell crosslinked polyethylene foam is bonded to the inner surface 26 of the outer shell 9. The inner lining 18 defines an inner surface 19 which in turn defines the hollow interior region 6 of the housing 5. By virtue of the fact that the inner lining 18 is deformable and resilient, the volume of the hollow interior region 6 is variable for accommodating expansion and contraction of the bladder 8. Expansion of the bladder 8 is accommodated by compressing the inner lining 18, while contraction of the bladder 8 is accommodated by recovery of the inner lining 18.

The bladder 8 is of a flexible plastic material, in this case, a three ply material with a nitrile inner ply, nitrile/PVC outer ply and nylon reinforcement. The bladder 8 substantially takes up the shape of the hollow interior region 6. A bladder inlet 32 for receiving the contents of the toilet pan 17 is formed by a circular inlet opening 33 in the bladder 8 which is defined by a re-inforcing ring 34 of the material of the bladder 8, but of thicker cross-section. A bladder outlet 36 from the bladder 8 for discharging sewage from the bladder 8 is formed by a circular outlet opening 37 which is defined by a re-inforcing ring 38 similar to the re-inforcing ring 34.

A circular opening 39 in the platform 15 forms a housing inlet 40 to the hollow interior region 6 for communicating the toilet pan 17 with the bladder inlet 32. The bladder inlet 32 is sealably secured to the housing inlet 40 by a clamping flange 42 and a sealing gasket 41. The clamping flange 42 is formed by a circular ring member of stainless steel. The sealing gasket 41 is of circular ring shape and of U-shape cross section and comprises flanges 43 joined by a circular web 44. Set screws 45 through the platform 15, the re-inforcing ring 34 and one of the flanges 43 of the sealing gasket 41 engage threaded holes 46 in the clamping flange 42 for sealably securing the re-inforcing ring 34 to the platform 15 and for retaining the clamping flange 42 in the bladder 8, see FIG. 5. The material of the sealing gasket 41 is relatively flexible to allow the set screws 45 to be secured through the platform 15 into the clamping flange 42.

A housing outlet 47 for accommodating discharge of sewage from the bladder 8 as will be described below is formed by a circular opening 48 in the platform 15. The bladder 8 is sealably secured to the platform 15 at the outlets 36 and outlet 47 in similar fashion as the bladder inlet 32 is secured to the housing inlet 40. A clamping flange 49 similar to the clamping flange 42 and a sealing gasket 57 similar to the sealing gasket 41 sealably clamp the re-inforcing ring 38 of the bladder outlet 36 to the platform 15. For convenience, components of the clamping flange 49 and the sealing gasket 57 which are identical to corresponding components of the clamping flange 42 and the sealing gasket 41 are identified by the same reference numerals. Set screws (not shown) similar to the set screws 46 sealably secure the platform 15, the re-inforcing ring 34, one of the flanges 43 of the sealing gasket 57 and the clamping flange 49 together.

The toilet pan 17 comprises a bowl 52 defining an interior region 53. A toilet outlet 54 extends from the bowl 52 through the bladder inlet 32 and the housing inlet 40 for discharging the contents of the bowl 52 into the bladder 8. The toilet outlet 54 terminates in a U-bend 55 which forms a water trap. To minimize the amount of flushing water required to flush the toilet pan 17, the outlet 54 extends centrally from the bowl 52. A mounting flange 56 extends around the toilet pan 17 for mounting the toilet pan 17 to the platform 15. In this embodiment of the invention, the clamping flange 42 acts as a mounting means for mounting the toilet pan 17 to the platform 15. Threaded holes 58 in the clamping flange 42 receive set screws 59 through the mounting flange 56, the sealing gasket 41, the platform 15 and the re-inforcing ring 34 for securing the toilet pan 17 on the platform 15 with the toilet outlet 54 extending through the housing inlet opening 39 and the bladder inlet opening 33. The set screws 52 further facilitate in sealably clamping the inlets 32 and 40 and the sealing gasket 41 together. A lid 50 and seat 51 are pivotally mounted on the bowl 52.

A pipe connecting flange 60 is sealably secured to the platform 15 and bladder 8 by screws 67 which extend through the sealing gasket 57, the platform 15, the re-inforcing ring 38 and engage threaded holes 68 in the clamping flange 49. The connecting flange 60 and clamping flange 49 sealably secure the outlets 36 and 47 and the sealing gasket 57 together. A discharge outlet pipe 61 is coupled to the connecting flange 60 and extends through the bladder outlet 36 for emptying the bladder 8 as will be described below. The discharge pipe 61 is of stainless steel material and comprises an inlet 62 which extends to substantially the lowest position in the bladder 8 for discharging the contents thereof. The surface 26 defined by the panel 21 of the base 14 inclines inwardly downwardly from the end walls 12 towards a centre ridge 63 which forms the lowest position of the bladder 8 at 63. The discharge pipe 61 extends upwardly through the connecting flange 60 and is bent at 64. A portion 65 of the discharge pipe 61 extending from the bend 64 extends through an opening 66 in the wall 2 of the toilet for discharging the sewage from the bladder 8. The portion 65 of the discharge pipe 61 terminates in an outlet 69 exteriorly of the wall 2. A cam lock type fitting is fitted to the pipe 61 at the outlet 69 for permitting coupling of the discharge pipe 61 to a hose for collecting the contents of the bladder 8 in a suitable mobile collecting tank. The discharge pipe 61 is inclined from its highest point to the inlet 62 to avoid the risk of sewage remaining in the discharge pipe 61 after sewage has been discharged therethrough from the bladder 8 which could subsequently freeze. In this embodiment of the invention, the portion 65 of the discharge pipe 61 is substantially horizontal and is thus the highest point of the discharge pipe 61. The discharge pipe 61 from the bend 64 inclines downwardly towards the inlet 62.

A closure housing 70 is mounted on the wall 2 for isolating the outlet 69 and the discharge pipe 61 from the exterior environment to minimise the passage of cold air into the bladder 8, thereby minimising the risk of freezing of the contents of the bladder 8. An access opening 71 through the closure housing 70 to the outlet 69 is closed by a hinged closure flap 72.

A vent pipe 74 extending through an opening 76 in the wall 2 of the toilet, vents the bladder 8. The vent pipe 74 is connected into the bladder 8 through a two-way valve 78 and a pipe 75 extending through the connecting flange 60. The pipe 75 is welded to the connecting flange 60. The two-way valve 78 selectively connects the pipe 75 to the vent pipe 74 and an inlet pipe 93 for pressurizing the bladder 8 for discharge of the contents through the discharge pipe 61 as will be described below. A handle 94 is provided on the valve 78 for operating the valve 78. For convenience, the vent pipe 74 terminates in an outlet 77 in the closure housing 70 to minimise the danger of cold air passing through the vent pipe 74 into the bladder 8 to minimise the risk of freezing of the contents of the bladder 8. A silicon sealant 79 is provided in the openings 66 and 76 for sealing the discharge pipe 61 and the vent pipe 74 in the opening 66 and 76 in the wall 2.

Plug means for releasably sealing the bladder 8 to facilitate pressurization thereof for discharging the contents of the bladder 8 through the discharge pipe 61 comprises a closure plug 80 for releasably and sealably engaging the interior 53 of the bowl 52 of the toilet pan 17, see FIG. 6. The closure plug 80 comprises a solid spigot 81 for extending into the outlet 54 from the bowl 52 and for aligning the closure plug 80 in the bowl 52. A groove 82 and flange 83 extending round the closure plug 80 accommodates an O-ring seal 84 for sealably engaging the closure plug 80 against an inner surface 92 of the interior region 53 of the bowl 52. Pressure release means for relieving a build-up in pressure in the bladder 8 during discharge of the contents comprises an annular ballast weight 88 mounted on the closure plug 80. A bore 89 through the ballast weight 88 accommodates the closure plug 80. The ballast weight 88 is supported on the flange 83 extending from the closure plug 80. The weight of the ballast weight is such as to permit the closure plug 80 to rise in the outlet 54 on the pressure in the bladder 8 reaching a certain predetermined level, so that the seal formed by the O-ring seal 84 is broken, thereby allowing pressure relief through the outlet 54. In this embodiment of the invention, the weight of the ballast weight is 22 lbs for allowing the closure plug 80 to relieve the pressure in the bladder 8, on the pressure in the bladder 8 reaching 3.0 psi. A buffer ring 90 of resilient plastics material mounted in an annular groove 91 extending round the ballast weight 88 prevents the ballast weight 88 directly engaging the toilet bowl 52.

A step 96 is provided adjacent one of the side walls 11 so that an individual can step onto the platform 15 to use the toilet pan 17. For convenience, the step 96 is illustrated ghosted in on FIG. 1.

In use, the toilet pan 17 is used in conventional fashion. The contents of the toilet pan 17 are flushed by water through the outlet 54 into the bladder 8 from any suitable supply of flushing water. The flushing water may be provided from a header tank, or alternatively, may be provided from a storage system and may be pumped by a suitable flushing pump. In fact, it is envisaged that where it is desired to conserve water, waste water from hand basins, baths and the like may be stored for flushing the toilet pan 17. In normal operation, the two-way valve 78 connects the pipe 75 with the vent pipe 74 for venting the bladder 8, thereby preventing a build-up of pressure in the bladder 8 during normal use.

Figure 5:
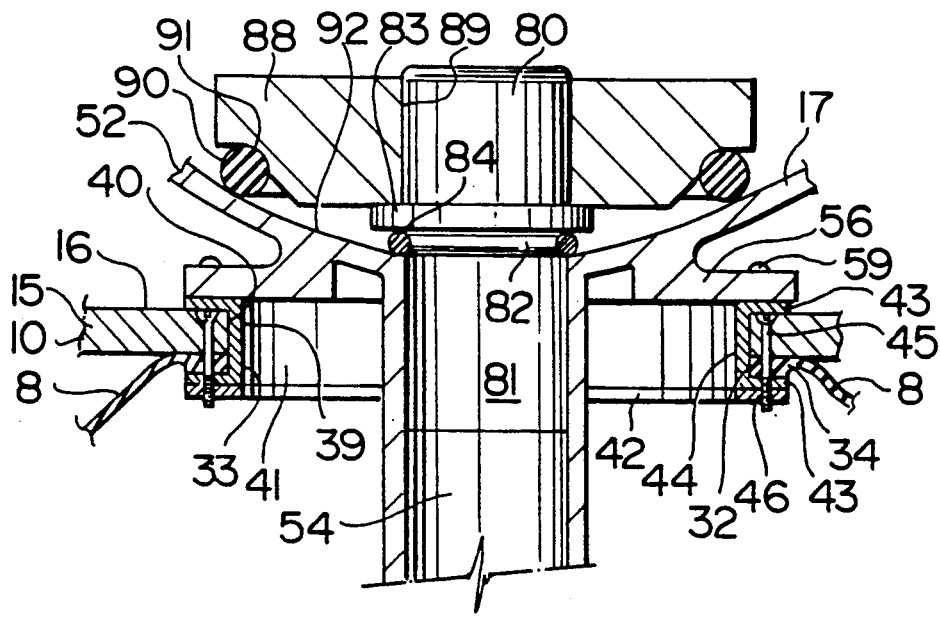
FIG. 5 is a cross sectional elevational view of another detail of the sewage tank of FIG. 1.
Figure 4:
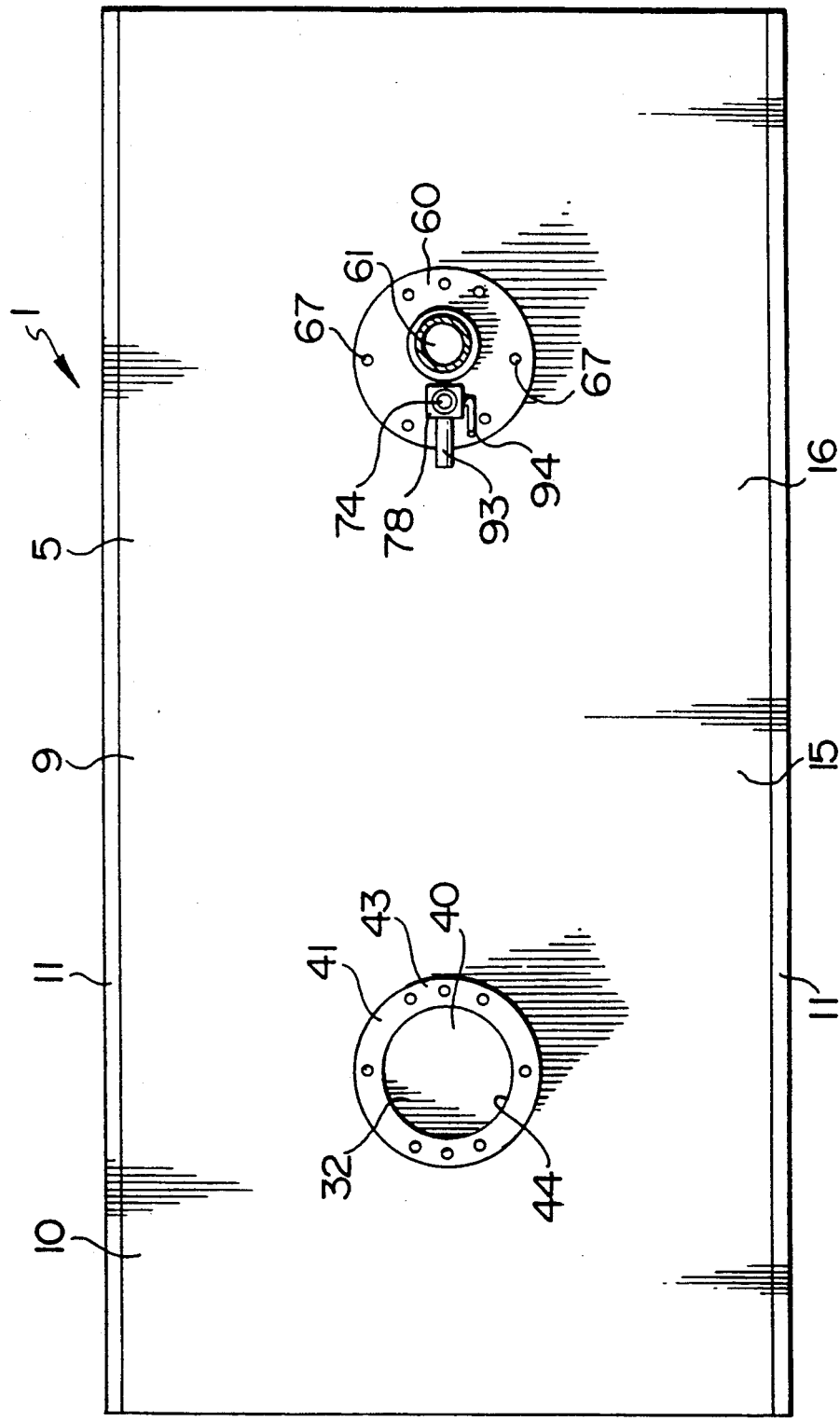
FIG. 4 is a plan view of the sewage tank of FIG. 1.

When it is desired to discharge the contents of the bladder 8 through the discharge pipe 61, the outlet 69 is coupled to a suitable hose, which in turn is connected to a collecting tank normally a mobile collecting tanker. The closure plug 80 with the buffer ring 90 and O-ring seal 84 in place is inserted in the toilet pan bowl 52 as illustrated in FIG. 5. The two-way valve 78 is switched to connect the pipe 75 to the inlet pipe 93, and an air pressure source, for example, a compressor, air blower or the like is coupled to the inlet pipe 93 for pressurizing the bladder 8. As the pressure builds up in the bladder 8, the contents are discharged through the discharge pipe 61. On discharge of the contents having being completed, the two-way valve 78 is switched to connect the pipe 75 with the vent pipe 74 for venting the bladder 8, the closure plug 80 is removed and the pressure source is disconnected from the inlet pipe 93. The hose connected to the outlet 69 is removed and the sewage tank 1 is ready for normal use.

In the event of the sewage contents of the bladder 8 freezing, the bladder 8, being of a resilient flexible material, commences to expand, thereby acting on the inner surface 19 of the inner lining 18 to cause the inner lining 18 to compress, thereby increasing the volume of the interior region 6 to accommodate expansion of the contents of the bladder 8. On thawing of the sewage contents, the inner lining 18 expands, thereby reducing the volume of the interior region 6.

Figure 8:
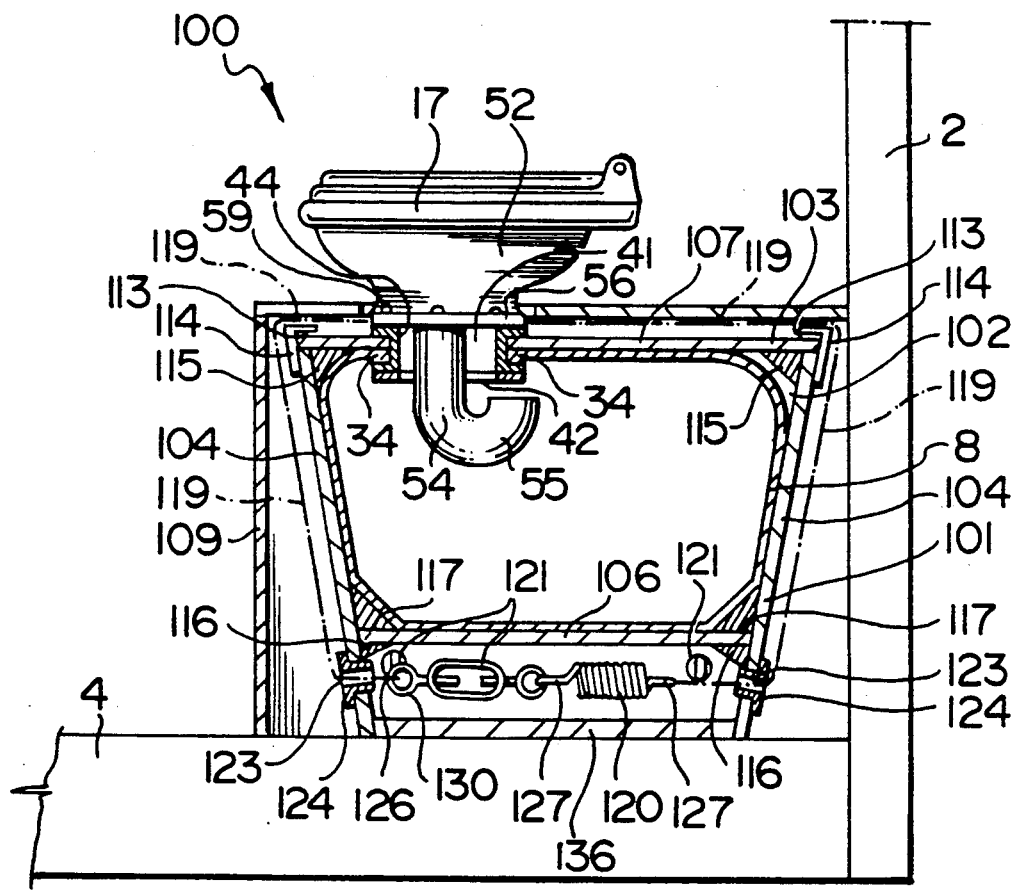
FIG. 8 is a sectional end elevational view on the line VIII—VIII of FIG. 7 of the sewage tank of FIG. 6.

Referring now to FIGS. 6 to 8, a sewage tank according to another embodiment of the invention indicated generally by the reference numeral 100 is illustrated. Some components of the sewage tank 100 are similar to the sewage tank 1 and in such cases similar components are identified by the same reference numerals. In this embodiment of the invention, the tank 100 comprises a support housing 101 which defines a hollow interior region 102 of variable volume within which a bladder 8, which is identical to the bladder 8 of the sewage tank of FIGS. 1 to 6, is housed. The support housing 101 is partly encased in a casing 109 of plywood.

The support housing 101 comprises a top wall 103 of plywood which forms a platform 107 similar to the platform 15 formed by the top wall 10 of the support housing 5. A pair of side walls 104 and a pair of end walls 105 of plywood extend downwardly from the top wall 103, and a base 106 of plywood extends between the side walls 104 and the end walls 105. The base 106 inclines inwardly downwardly from the end walls 105 to a lower central ridge 110. The top wall 106, the side walls 104, end walls 105 and base 106 define the hollow interior region 102. The side walls 104 and end walls 105 are movably mounted relative to the base 106 and the top wall 103 and relative to each other for varying the volume of the interior region 102 for accommodating expansion and contraction of the bladder 8. Angle wear brackets 114 and timber fillets 115 secured to the side and end walls 104 and 105, respectively, define slots 113 which slidably engage the top wall 103 to accommodate relative inward and outward sliding movement of the side and end walls 104 and 105, respectively, on the one hand, and the top wall 103 on the other hand. Fillets 116 of timber on the end walls 105 define elongated slots 117 which slidably engage end edges 118 of the base 106 also for accommodating relative inward and outward movement of the end walls 105.

Resilient connecting means retain the side walls 104 and end walls 105 together and in engagement with the top wall 103 and base 106. Each resilient connecting means comprises an elongated cable 119, a tension spring 120 and adjustment means, in this embodiment of the invention, a tensioning turnbuckle 121. Two cables 119 extend round the top wall 103 and the end walls 105 for retaining the end walls 105 in engagement with the top wall 103 and the base 106. Two cables 119 also extend around the top wall 103, the side walls 104 and the base member 106 for retaining the side walls 104 in engagement with the top wall 103 and the base 106. Openings 123 in the side and end walls 104 and 105, respectively, having wear plugs 124 mounted therein accommodate the cables 119 through the end and side walls 104 and 105 respectively. The cables 119 engage the angle wear brackets 114 to avoid wearing of the top wall 103. Ends 126 of the cables 119 retaining the end walls 105 in position are connected to respective eyes 127 of the corresponding tension springs 120 and eyes 130 of the corresponding turnbuckles 121 for tensioning the cables 119. Ends 126 of the cables 119 retaining the side walls 104 in position are connected to respective eyes 127 and 130 of corresponding springs 120 and turnbuckles 121 for tensioning the cables 111. In this case, the respective springs 120 and corresponding turnbuckles 121 are connected together by their respective eyes 127 and 130. A housing inlet 40 and a housing outlet 47 are provided in the top wall 103 to accommodate the bladder inlet 32 and the bladder outlet 36, respectively. The housing inlet 40 and the housing outlet 47 are similar to the housing inlet and outlet 40 and 47, respectively, in the top wall 10 of the support housing 5. The bladder inlet 32 is secured to the housing inlet 40 in similar fashion to that of the sewage tank 1 by a clamping flange 42 and a sealing gasket 41. The toilet pan 17 is secured to the clamping flange 42 in identical fashion as in the case of the support housing 5.

The bladder outlet 36 is secured to the housing outlet 47 in similar fashion as the bladder outlet and housing outlet are secured in the case of the sewage tank 1. The discharge pipe 61 and vent pipe 74 are likewise connected into the bladder 8 in similar fashion to the discharge pipe 61 and the vent pipe 74 of the sewage tank 1.

A sheet 136 of heat insulating material, namely, expanded polystyrene material, is provided beneath the base 106 to reduce the risk of the contents of the bladder 8 freezing. A wear strip 138 is provided internally in the bladder 8 to prevent wear of the bladder 8 against the discharge pipe 61 on expansion and contraction of the bladder 8.

Operation of the sewage tank 100 is identical to that of the sewage tank 1. The use of the toilet pan 17 is similar to the use of the toilet pan 17 on the sewage tank 1, while discharge of the contents of the bladder 8 are similar to discharge of the contents of the bladder 8 from the sewage tank 1.

In the event of the contents of the bladder 8 freezing and expanding, the side walls 104 and/or end walls 105 move outwardly, thereby increasing the volume of the interior region 102 to accommodate expansion of the contents of the bladder 8. On the contents of the bladder 8 thawing, the bladder 8 contracts, and accordingly, the side walls 104 and/or end walls 105 move inwardly, thereby reducing the volume of the interior region 102.

While a particular shape and construction of tank, support housing and bladder have been described, any other desired shape may be used.

While a particular construction of toilet pan and discharge pipe have been described, any other suitable construction of discharge pipe and toilet pan may be used.

It will of course be appreciated that while the tank has been described as being a sewage tank, the tank may be used for storing any other liquid. Indeed, in certain cases, it is envisaged that the tank may be used for storing water.

Furthermore, while the sewage tank has been described as comprising a toilet pan, the toilet pan may be dispensed with. Furthermore, it is envisaged that the support housing may be provided on its own without the bladder.

It will also be appreciated that while in the embodiment of the invention described with reference to FIGS. 1 to 5, the support housing has been described as being provided with an inner lining which provides for varying the volume of the interior region of the housing, any other suitable construction of support housing may be provided with a variable interior volume. Furthermore, it will also be appreciated that other constructions of support housing besides that described with reference to FIGS. 6 to 8 for providing an interior region of variable volume may be provided.

In the case of the sewage tank 100 described with reference to FIGS. 6 to 8, the resilient connecting means may be provided by compression springs instead of tension springs. Needless to say, other resilient means may be used without departing from the scope of the invention. Furthermore, it will be appreciated that the outlet from the bladder may be located in any other position besides at the top of the bladder. Indeed, in certain cases, it is envisaged that the outlet may be provided at the bottom of the bladder and the discharge pipe would merely be coupled to the bladder out. Suitable valving means would be provided for isolating the discharge pipe from the bladder. Indeed, in such cases, it is envisaged that the bladder may be emptied through the discharge pipe by gravity.

Indeed, it will be appreciated by those skilled in the art that the compressible resilient inner lining of the sewage tank of FIGS. 1 to 5 will also act as a heat insulating material for insulating the bladder.

We claim:

1. A tank comprising:
   a support housing for supporting a bladder, the housing being of a relatively rigid material and defining a hollow interior region for the bladder, the interior region being of variable volume for accommodating expansion and contraction of the bladder, and the housing having an inlet to the hollow interior region, and
   a bladder mounted in the hollow interior region, the bladder having an inlet, communicating with the housing inlet.

2. A tank as claimed in claim 14 in which the housing comprises a plurality of walls, the walls defining the hollow interior region, and resilient connecting means retaining at least some of the walls in position for accommodating relative movement of the said at least some walls, for varying the volume of the interior region.

3. A tank as claimed in claim 2 in which opposite walls of the housing are retained together by the resilient connecting means.

4. A tank as claimed in claim 2 in which each resilient connecting means comprises a spring means connected to respective walls by a cable.

5. A tank as claimed in claim 4 in which adjustment means for adjusting the retaining force in each spring means is provided.

6. A tank as claimed in claim 1 in which the housing comprises an outer shell defining an inner surface, and an inner lining of a deformable resilient material defining at least a portion of the hollow interior region being provided on at least a portion of the inner surface of the outer shell.

7. A tank as claimed in claim 6 in which the deformable resilient material is a compressible material.

8. A tank as claimed in claim 6 in which the deformable resilient material is a plastics material.

9. A tank as claimed in claim 6 in which the outer shell is of the relatively rigid material.

10. A tank as claimed in claim 1 in which heat insulating means is provided in the housing for insulating at least portion of the bladder.

11. A tank as claimed in claim 1 combined with a bladder and in which the housing comprises a top wall which forms a platform for receiving a toilet pan, the housing inlet to the interior region being formed by an opening in the platform, and mounting means being provided on the platform for mounting the toilet pan thereon with an outlet from the toilet pan communicating with an inlet to the bladder through the housing inlet for discharging the contents of the toilet pan into the bladder.

12. A tank as claimed in claim 11 in which the housing comprises a top wall, a pair of side walls joined by a pair of end walls, the said side and end walls extending downwardly from the top wall, and a base extending between the side and end walls.

13. A tank as claimed in claim 12 in which the base comprises an upper surface which defines a portion of the interior region of the housing, the said upper surface inclining inwardly downwardly form the opposite end walls.

14. A tank as claimed in claim 1 in which the bladder comprises a bladder outlet and the support housing comprises a housing outlet from the interior region, the bladder outlet communicating with the housing outlet for discharge of the contents of the bladder.

15. A tank as claimed in claim 14 in which a discharge outlet pipe extends through the housing outlet and the bladder outlet for discharging the contents thereof.

16. A tank as claimed in claim 15 in which the discharge outlet pipe extends downwardly into the bladder to a relatively low position in the bladder for discharging the contents thereof.

17. A tank as claimed in claim 14 in which the discharge outlet pipe inclines downwardly from its highest point to an inlet thereto or an outlet therefrom to avoid the collection of sewage therein.

18. A tank as claimed in claim 1 in which a toilet pan comprising a bowl defining an interior region is mounted on the platform, a toilet outlet from the interior region of the bowl communicating with the bladder through the housing inlet and the bladder inlet, and plug means for releasably and sealably engaging the interior region of the toilet pan being provide for permitting pressurization of the bladder for discharge of the contents therefrom.

19. A tank as claimed in claim 18 in which pressure release means for relieving pressure in the bladder are provided on the plug means.

* * * * *